Patented Mar. 8, 1949

2,463,573

UNITED STATES PATENT OFFICE 2,463,573

VINYLIDENE CHLORIDE-BUTADIENE-VINYL CHLORIDE INTERPOLYMERS

George William Stanton and Charles Everett Lowry, Midland, Mich., assignors to The Dow Chemical Company, Midland, Mich., a corporation of Delaware No Drawing. Application May 16, 1946, Serial No. 670,282

3 Claims. (Cl. 260—78.5)

This invention relates to vulcanizable interpolymers suitable for use as calendered coatings for flexible base materials and for the manufacture of synthetic rubber-like products. It relates in particular to certain interpolymers of vinylidene chloride, a diene-1,3 hydrocarbon and vinyl chloride.

Some of the binary copolymers of vinylidene chloride and vinyl chloride are disclosed by Wiley in U. S. Patents Nos. 2,160,931 and 2,235,782. The binary copolymers of vinylidene chloride and butadiene-1,3 are disclosed and claimed in U. S. Patents Nos. 2,215,379, 2,376,208 and 2,380,356, issued to the assignees of Sebrell, Tucker, and Youker, respectively.

The vinylidene chloride-vinyl chloride binary copolymers are non-rubbery thermoplastics. They range in properties from relatively insoluble materials at high vinylidene chloride concentrations through a more soluble range of intermediate proportions, reverting to substantially insoluble materials in the high vinyl chloride range. When molded they form rigid articles.

The vinylidene chloride-butadiene-1,3 binary copolymers vary from rigid thermoplastic and highly insoluble materials at vinylidene chloride concentrations above 90 per cent through strong rubbers having from 20 to 50 per cent and more of butadiene. At least when some of the commoner polymerization methods are employed the vinylidene chloride-butadiene binaries containing roughly from 60 to 90 per cent butadiene are factice-like solids of rather low strength which are capable of but little elongation. Though many of them are vulcanizable, the copolymers comprising this binary system are deficient as regards most required properties for a coating material and they have defects which make many of them relatively unsuitable for use in the manufacture of mechanical rubber goods.

It is an object of the present invention to provide a vulcanizable synthetic rubber-like material suitable for use in the manufacture of mechanical rubber goods and adapted to serve as abrasion resistant and moisture impervious coatings for flexible base materials. A particular object is to provide such a composition which can be applied as a calendered coating. A further object is to provide a vulcanizable synthetic rubber-like material which itself is highly resistant to the action of many common organic solvents and of such liquids as petroleum distillates. A particular object is to provide such a composition comprising an interpolymer of vinylidene chloride, butadiene-1,3 and vinyl chloride. Other and related objects may appear hereinafter.

In the following description, the term "butadiene" is understood to mean butadiene-1,3. The term "isoprene" refers to 2-methyl butadiene-1,3. "Interpolymer" is used herein to mean the product obtained by the polymerization of a mixture of three or more monomers. To distinguish therefrom, the term "copolymer" is arbitrarily used herein to designate a product similarly derived from a mixture of two monomers.

It has now been found that the foregoing and related objects may be attained through the provision of the ternary interpolymers produced from a monomeric mixture of from 20 to 80 per cent vinylidene chloride, from 15 to 50 per cent butadiene or of isoprene and from 5 to 50 per cent vinyl chloride. More particularly, the foregoing objects are realized through the provision of an interpolymer of from 20 to 65 per cent vinylidene chloride, from 25 to 35 per cent butadiene and from 10 to 50 per cent vinyl chloride. The preferred interpolymer for use in coating operations and in the manufacture of mechanical rubber goods or other articles requiring low elasticity combined with high solvent resistance and good abrasion resistance, is one containing from 45 to 65 per cent vinylidene chloride, 25 to 35 per cent butadiene and 10 to 20 per cent vinyl chloride. A specific and highly desirable interpolymer having the above-noted properties is one formed by the polymerization of a monomeric mixture of 55 per cent vinylidene chloride, 30 per cent butadiene and 15 per cent vinyl chloride. The preferred interpolymer for use where high elasticity and high abrasion resistance are required together with an unusual resistance to the effect of petroleum distillates and other organic liquids is one obtained by the interpolymerization of from 20 to 45 per cent vinylidene chloride, from 25 to 35 per cent butadiene and from 30 to 50 per cent of vinyl chloride. A specific advantageous composition within this range is made from a monomeric mixture of 35 per cent vinylidene chloride, 30 per cent butadiene and 35 per cent vinyl chloride.

The ternary interpolymers of the present invention are most conveniently made by the emulsion polymerization process, preferably employing a mildly alkaline aqueous medium as the continuous phase of the emulsion. The new interpolymers have also been made in emulsion using the acidic conditions and catalyst described by Britton and Le Fevre in U. S. Patent No. 2,333,633. They have also been made in aqueous suspension, without emulsifying agents, using benzoyl peroxide as the catalyst. For the present purposes of comparison between the various compositions in the interpolymer system under consideration, a standard polymerization procedure was adopted eliminating as far as possible any variations due to changes in relative concentrations of the disperse and continuous phases, catalysts, temperatures, emulsifiers, alkalies and the like. The standard procedure for small scale preparations is as follows:

A stock solution is prepared consisting of 98.5 per cent by weight of pure water, one per cent of a purified grade of sodium lauryl sulfate and 0.5 per cent of sodium carbonate. To 75 parts by weight of the aqueous stock solution is added 25 parts by weight of the chosen monomers in the proportions being investigated, and 0.125 parts of potassium persulfate is added as a catalyst. The mixture is emulsified by agitation and is kept at a constant temperature of 55° C. in a sealed vessel until polymerization has progressed to the desired extent. There is then added a small amount, suitably about 0.4 per cent, of an antioxidant, such as polymerized trimethyl dihydroquinoline. The latex is then coagulated after dilution with water, by addition of a 50 per cent aqueous methanol solution containing 0.4 per cent of magnesium chloride. The coagulum is washed with water and vacuum dried at 70° C. overnight. When making batches involving more than about a gallon of reaction medium the amount of monomer is increased to about 33.3 per cent of the weight of the emulsion and the stock solution is correspondingly fortified to contain about 1.5 per cent of the emulsifying agent and 0.75 per cent of sodium carbonate. The catalyst concentration is increased correspondingly to about .165 per cent.

The new interpolymers may be used either in their natural state, or after being compounded, for the purpose of applying coatings to flexible base materials or for the preparation of moldings, sheet or film. A wide variety of formulations may be employed to yield satisfactorily compounded materials from the new interpolymers. For the purposes of the present description, and in order to obtain representative and comparable values in those tests carried out on compounded and vulcanized batches of the present ternary interpolymers, a standard procedure was developed and a standard formulation was employed. That formulation contained the following ingredients in the designated parts by weight:

| | |
|---|---|
| Interpolymer | 100 |
| Stearic acid | 1 |
| Butyl phthalyl butyl glycolate (plasticizer) | 10 |
| Litharge | 5 |
| Benzothiazyl disulfide (accelerator) | 1 |
| Sulfur | 2 |
| Carbon black | 35–40 |

(The preferred carbon blacks were selected from the class of "easy processing" channel blacks and "semi-reinforcing" furnace blacks.)

In preparing the test formulations, the interpolymers are first broken down on a cold mill, the addition agents are milled into the interpolymer in the order named, and the mixture is sheeted from the mill. It may be sheeted directly to a calender stack where the compounded sheet is brought into contact with a sheet of paper, cloth, or other flexible base material which it is desired to coat, and the assembly is passed through the stack to effect a reduction in thickness of the coating and to insure the provision of a uniform and continuous coating on the flexible base. The compounded sheet may also be fed from the mill through the calender stack without a supporting base material, thus providing a thin sheet or film of the compounded interpolymer. It is generally found desirable to cure the calendered films or coated or molded articles, before they are adapted to use in commerce. Such cure can be effected at about 138° C. with or without the application of super-atmospheric pressure (suitably up to 400 pounds per square inch) for periods up to about 75 minutes.

The ternary interpolymers of the present invention are produced much more advantageously than is a butadiene-vinylidene chloride binary copolymer, as the polymerization rate for the present mixtures is considerably greater than that encountered when producing the binary copolymers. It is also found that the new interpolymers may be completely cured, when compounded as previously described, in a much shorter period of time than can a similarly compounded material based upon the 70 per cent butadiene-30 per cent vinylidene chloride copolymer (hereinafter referred to, for comparison as copolymer A). Thus, the present interpolymers may be fully cured under a given set of conditions in about 60 minutes while copolymer A requires from 100 to 120 minutes to reach a full cure.

It has been found that both molded sheets and calendered films produced from those of the new interpolymers which contain from 5 to 20 per cent of vinyl chloride have from 1.1 to 1.25 times as great resistance to tear (ASTM D624–41T) as do corresponding sheets or films produced from copolymer A. These same interpolymers containing from 5 to 20 per cent of vinyl chloride have less resilience, as evidenced by their Bashore rebound values, than does the said copolymer A. When, however, the amount of vinyl chloride in the ternary interpolymer is in the range from 30 to 50 per cent the resilience of the product is from two to three times as great as that of copolymer A.

In an abrasion resistance test carried out on uncured samples of the present ternary interpolymers, in comparison with samples of copolymer A, it is found that a ternary comprising 35 per cent vinylidene chloride, 30 per cent butadiene and 35 per cent vinyl chloride has twice as long a life when subjected to abrasion as does copolymer A under otherwise identical conditions. All of the interpolymers of the present invention exhibit surprisingly high resistance to abrasion.

Molded sheets and calendered films and coatings made from the compounded and cured interpolymers of this invention have a low temperature brittle point of −30° C. when the interpolymer contains 55 per cent vinylidene chloride, 30 per cent butadiene and 15 per cent vinyl chloride. By way of contrast, similar articles produced from copolymer A have a brittle point of only −20° C.

Compounded and cured articles produced from the ternary interpolymer of 55 per cent vinylidene chloride, 30 per cent butadiene and 15 per cent vinyl chloride exhibit a tensile stress at 100 per cent elongation of 2,000 pounds per square inch, while similar articles based upon copolymer A have a tensile stress value under the same conditions of only 785 pounds per square inch.

The data herein presented indicates a noticeable superiority of the present interpolymer over the previously disclosed binary copolymer While the specific examples have been based upon compositions containing about 30 per cent butadiene, other tests indicate that remarkably useful general purpose synthetic rubbers may be produced when the butadiene content of the original monomeric mixture subjected to polymerization is as low as 15 per cent or as high as 50 per cent. Amounts of butadiene less than 15 per cent in the mixture originally subjected to polymerization result in the formation of materials which are too rigid and in some cases too unstable for use as general purpose synthetic rubbers. When the amount of butadiene in that original mixture is in excess of 50 per cent the rubber-like materials produced are too soft and too weak for most practical applications. The preferred compositions as previously stated are those interpolymers which are made from monomeric mixtures in which the butadiene content is between 25 and 35 per cent.

Similar advantages may be shown for the corresponding ternary interpolymers containing isoprene as the diene hydrocarbon, in comparison with the vinylidene chloride-isoprene binary copolymers.

We claim:

1. A vulcanizable interpolymer made by dispersing in water and polymerizing together a monomeric mixture of 30 per cent butadiene, 35 to 55 per cent vinylidene chloride and complementarily 35 to 15 per cent of vinyl chloride.

2. A vulcanizable interpolymer made by dispersing in water and polymerizing together a monomeric mixture of 30 per cent butadiene, 55 per cent vinylidene chloride and 15 per cent of vinyl chloride.

3. A vulcanizable interpolymer made by dispersing in water and polymerizing together a monomeric mixture of 30 per cent butadiene, 35 per cent vinylidene chloride and 35 per cent of vinyl chloride.

GEORGE WILLIAM STANTON.
CHARLES EVERETT LOWRY.

REFERENCES CITED

The following references are of record in the file of this patent:

UNITED STATES PATENTS

| Number | Name | Date |
|---|---|---|
| 2,333,403 | Youker | Nov. 2, 1943 |
| 2,388,372 | Stewart | Nov. 6, 1945 |
| 2,400,036 | Wooddell et al. | May 7, 1946 |